United States Patent
Henriques et al.

(10) Patent No.: US 12,028,359 B1
(45) Date of Patent: Jul. 2, 2024

(54) METHOD OF RANKING AND ADDRESS NETWORK THREATS

(71) Applicant: Coalition, Inc., San Francisco, CA (US)

(72) Inventors: Tiago Henriques, San Francisco, CA (US); Vignesh Narayanaswamy, San Francisco, CA (US); Sofia Izmailov, San Francisco, CA (US)

(73) Assignee: Coalition, Inc., San Francisco, CA (US)

( * ) Notice: Subject to any disclaimer, the term of this patent is extended or adjusted under 35 U.S.C. 154(b) by 0 days.

(21) Appl. No.: 18/383,796

(22) Filed: Oct. 25, 2023

(51) Int. Cl.
*H04L 9/40* (2022.01)

(52) U.S. Cl.
CPC .................. *H04L 63/1416* (2013.01)

(58) Field of Classification Search
CPC .................................................. H04L 63/1433
See application file for complete search history.

(56) References Cited

U.S. PATENT DOCUMENTS

| | | | | |
|---|---|---|---|---|
| 8,533,840 | B2* | 9/2013 | Redlich | G06F 21/6245 707/708 |
| 10,320,841 | B1* | 6/2019 | Allen | G06N 20/00 |
| 10,462,173 | B1* | 10/2019 | Aziz | G06F 21/566 |
| 11,777,988 | B1* | 10/2023 | Lin | H04L 63/1491 726/22 |
| 11,777,992 | B1* | 10/2023 | Cross | H04L 63/20 726/5 |
| 2010/0077483 | A1* | 3/2010 | Stolfo | G06F 21/554 726/23 |
| 2014/0096251 | A1* | 4/2014 | Doctor | H04L 63/1441 726/23 |
| 2017/0070523 | A1* | 3/2017 | Bailey | H04L 63/0861 |
| 2018/0316711 | A1* | 11/2018 | Iyer | H04L 63/1433 |
| 2019/0116136 | A1* | 4/2019 | Baudart | H04L 63/1491 |
| 2019/0289034 | A1* | 9/2019 | Erez | H04L 63/1416 |
| 2019/0334942 | A1* | 10/2019 | Wicker | H04L 63/1433 |
| 2020/0067980 | A1* | 2/2020 | Livny | G06N 3/08 |
| 2020/0153861 | A1* | 5/2020 | Park | H04L 45/745 |
| 2021/0273967 | A1* | 9/2021 | Vela | H04L 63/1466 |
| 2021/0344690 | A1* | 11/2021 | Sharifi Mehr | G06F 16/25 |
| 2022/0070218 | A1* | 3/2022 | Sellers | H04L 63/1416 |
| 2022/0191235 | A1* | 6/2022 | Ni | G06F 16/245 |
| 2022/0279008 | A1* | 9/2022 | Nishijima | H04L 63/1416 |
| 2023/0177169 | A1* | 6/2023 | Bulut | H04L 9/002 726/1 |
| 2023/0205891 | A1* | 6/2023 | Yellapragada | H04L 63/1433 726/25 |
| 2023/0252158 | A1* | 8/2023 | Bishop, III | G06F 21/566 726/25 |
| 2023/0336579 | A1* | 10/2023 | Ellsworth | H04L 63/1433 |

(Continued)

*Primary Examiner* — Khang Do
(74) *Attorney, Agent, or Firm* — Loeb & Loeb LLP

(57) ABSTRACT

A method of evaluating threats to a network may gather existing threat from a plurality of online sources, collect the existing threats in a database and format the data representing existing threats in the database for review. The method may determine a rating for each existing threat, evaluate attractiveness of honeypots to threats and adjusting the ratings for the threats based on the attractiveness of the honeypots. The method may evaluate applications on network, rank the threats based on the apps and communicate the rankings to a user.

17 Claims, 4 Drawing Sheets

(56) References Cited

U.S. PATENT DOCUMENTS

| | | | |
|---|---|---|---|
| 2023/0362200 A1* | 11/2023 | Crabtree | G06F 16/951 |
| 2023/0370439 A1* | 11/2023 | Crabtree | H04L 63/0807 |
| 2023/0379361 A1* | 11/2023 | Sengupta | H04L 63/1425 |
| 2023/0385548 A1* | 11/2023 | Tully | G06F 40/30 |
| 2023/0412619 A1* | 12/2023 | Tshouva | H04L 63/1416 |

* cited by examiner

METHOD OF RANKING AND ADDRESS NETWORK THREATS

BACKGROUND

Online threats continue to be a challenge for even the most sophisticated organizations. Attacks continue to use new and novel techniques to infiltrate networks and cause problems for the victims. Defenders continue to adjust and change in response to new threats. However, online threats continue to be a problem.

SUMMARY

A method of evaluating threats to a network is described. The method may gather existing threat data from a plurality of online sources, collect the existing threats in a database and format the data representing existing threats in the database for review. The method may determine a rating for each existing threat, evaluate attractiveness of honeypots to threats and adjusting the ratings for the threats based on the attractiveness of the honeypots. The method may evaluate applications on network, rank the threats based on the applications and communicate the rankings to a user.

Figure 1:
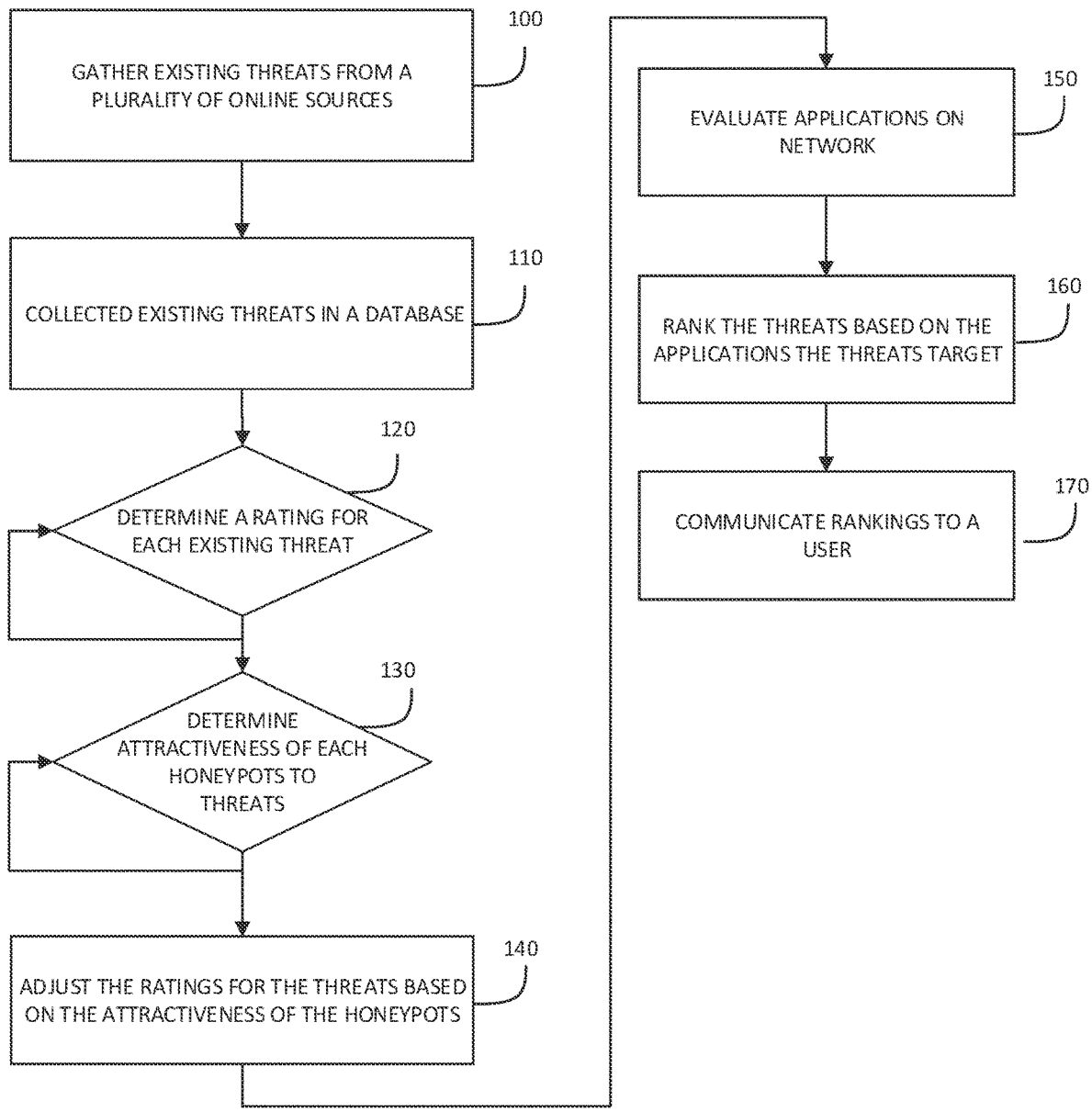
FIG. 1 may illustrate a method of determining threats to a network.

Persons of ordinary skill in the art will appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meanings have otherwise been set forth herein.

The present claimed system and method may overcome the limitations of the previous systems by providing a system to analyze available data and information about approaches to honeypots into information about threats. The method may gather existing threat data from a plurality of online sources, collect the existing threats in a database and format the data representing existing threats in the database for review. The method may determine a rating for each existing threat, evaluate attractiveness of honeypots to threats and adjusting the ratings for the threats based on the attractiveness of the honeypots. The method may evaluate applications on network, rank the threats based on the applications and communicate the rankings to a user.

All dimensions specified in this disclosure may be by way of example only and are not intended to be limiting. Further, the proportions shown in these Figures may not be necessarily to scale. As will be understood, the actual dimensions and proportions of any system, any device or part of a system or device disclosed in this disclosure may be determined by its intended use.

Methods and devices that may implement the embodiments of the various features of the invention will now be described with reference to the drawings. The drawings and the associated descriptions may be provided to illustrate embodiments of the invention and not to limit the scope of the invention. Reference in the specification to "one embodiment" or "an embodiment" may be intended to indicate that a particular feature, structure, or characteristic described in connection with the embodiment may be included in at least an embodiment of the invention. The appearances of the phrase "in one embodiment" or "an embodiment" in various places in the specification may not necessarily be referring to the same embodiment.

Throughout the drawings, reference numbers may be re-used to indicate correspondence between referenced elements. As used in this disclosure, except where the context requires otherwise, the term "comprise" and variations of the term, such as "comprising", "comprises" and "comprised" may not be intended to exclude other additives, components, integers or steps.

In the following description, specific details may be given to provide a thorough understanding of the embodiments. However, it may be understood by one of ordinary skill in the art that the embodiments may be practiced without these specific details. Well-known circuits, structures and techniques may not be shown in detail in order not to obscure the embodiments. For example, circuits may be shown in block diagrams in order not to obscure the embodiments in unnecessary detail.

Also, it is noted that the embodiments may be described as a process that is depicted as a flowchart, a flow diagram, a structure diagram, or a block diagram. The flowcharts and block diagrams in the figures may illustrate the architecture, functionality, and operation of possible implementations of systems, methods and computer programs according to various embodiments disclosed. In this regard, each block in the flowchart or block diagrams may represent a module, segment, or portion of code, that may include one or more executable instructions for implementing the specified logical function(s). It should also be noted that, in some alternative implementations, the functions noted in the blocks may occur out of the order noted in the figures.

Although a flowchart may describe the operations as a sequential process, many of the operations may be performed in parallel or concurrently. In addition, the order of the operations may be rearranged. A process may be terminated when its operations are completed. A process may correspond to a method, a function, a procedure, a subroutine, a subprogram, etc. When a process corresponds to a function, its termination may correspond to a return of the function to the calling function or the main function. Additionally, each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

Moreover, a storage may represent one or more devices for storing data, including read-only memory (ROM), random access memory (RAM), magnetic disk storage mediums, optical storage mediums, flash memory devices and/or other non-transitory machine readable mediums for storing information. The term "machine readable medium" may include, but is not limited to portable or fixed storage devices, optical storage devices, wireless channels and various other non-transitory mediums capable of storing, comprising, containing, executing or carrying instruction(s) and/or data.

Furthermore, embodiments may be implemented by hardware, software, firmware, middleware, microcode, or a combination thereof. When implemented in software, firmware, middleware or microcode, the program code or code segments to perform the necessary tasks may be stored in a machine-readable medium such as a storage medium or other storage(s). One or more than one processor may perform the necessary tasks in series, distributed, concurrently or in parallel. A code segment may represent a procedure, a function, a subprogram, a program, a routine, a subroutine, a module, a software package, a class, or a combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted through a suitable means including memory sharing, message passing, token passing, network transmission, etc. and are also referred to as an interface, where the interface is the point of interaction with software, or computer hardware, or with peripheral devices.

Referring to FIG. 1, a method and system of addressing online threats may be disclosed. Online threats continue to be a challenge for even the most sophisticated organizations. Attacks continue to use new and novel techniques to infiltrate networks and cause problems for the victims. Defenders continue to adjust and change in response to new threats. However, online threats continue to be a problem.

A method of evaluating threats to a network is described. The method may gather existing threat from a plurality of online sources, collect the existing threats in a database and format the data representing existing threats in the database for review. The method may determine a rating for each existing threat, evaluate attractiveness of honeypots to threats and adjusting the ratings for the threats based on the attractiveness of the honeypots. The method may evaluate applications on network, rank the threats based on the apps and communicate the rankings to a user.

At block 100, the method and system may gather existing threats from a plurality of online sources. The existing threats may be gathered from a variety of sources. Some possible sources include the national vulnerability database, the exploit prediction scoring system, exploitDB, GitHub and social media accounts. As an example, GitHub may have a discussion of vulnerabilities and may have code to address the vulnerabilities. Similarly, social media accounts may be dedicated to discussing vulnerabilities and possible solutions. Web sites and blogs may also contain useful data for identifying and addressing vulnerabilities.

At block 110, the existing threats may be collected in a database. The type of database is many and varied. In one aspect, the database may need to be secure and extensible as solutions to vulnerabilities can create new threats and the database of information of the threats may grow.

In some embodiments, the data on existing threats may be formatted for storage in a database for review. In one embodiment, formatting data representing existing threats in the database for review may include representing the existing threats in a numerical form. For example, a 1 may represent an existing threat is present and a 0 may represent an existing threat is not present. The database format may know the first entry is a threat on application A and the second entry is a threat on application B such that only 1 and 0s need to be stored.

At block 120 a rating for each existing threat may be determined. The rating may be based on the risk the threat poses to a system. As an example, a threat that allows access to the root of a system may be given a high rating. Similarly, a threat that allowed access to personally identifiable information may be given a high rating. In contrast, a threat that only accessed systems which contain no useful data or to systems which no longer used may be viewed as lower threats. The rating may continue until the available existing threats in question have been evaluated and then the method may proceed to block 130.

At block 130, attractiveness of honeypots to threats may be evaluated. The attractiveness may be determined in a variety of ways. In some embodiments, the number of hits on a honeypot during a period of time may be used to indicate the attractiveness. In another embodiment, the change in the number of hits to a honeypot may be used to indicate the attractiveness. In yet another embodiment, the persistence of a single attacker trying to attack a honeypot may be used to indicate the attractiveness. In yet another embodiment, if the attacker is known, the strength of the attacker may be used to indicate the attractiveness. In yet another aspect, some of the measures of attractiveness may be combined into an index and the index may be used to indicate the attractiveness of the honeypots. Of course, other methods are possible and are contemplated. The attractiveness evaluation may continue until the honeypots in question are evaluated and then the method may proceed to block 140.

At block 140, the ratings for the threats based on the attractiveness of the honeypots may be adjusted. In one aspect, adjusting the ratings for the threats based on the attractiveness of the honeypots may include setting honeypots and determining the number of threats that access the honeypots during a period of time. In one embedment, the method may determine the origin of the threats, store the origins, compare the origins across a plurality of honeypots and rank the origins based on the number of honeypots accessed.

At block 150, applications on network may be evaluated. As some threats may be directed at specific applications, some applications may be a greater risk than other applications. Thus, it may make sense to rank applications that are threatened more often as riskier.

At block 160, the threats may be ranked based on the applications the threats target. For example, the system and method may determine the ability of the threats to access the honeypots and rank the threats on the ability to access the honeypots. Of course, other methods are possible and are contemplated.

Figure 2:
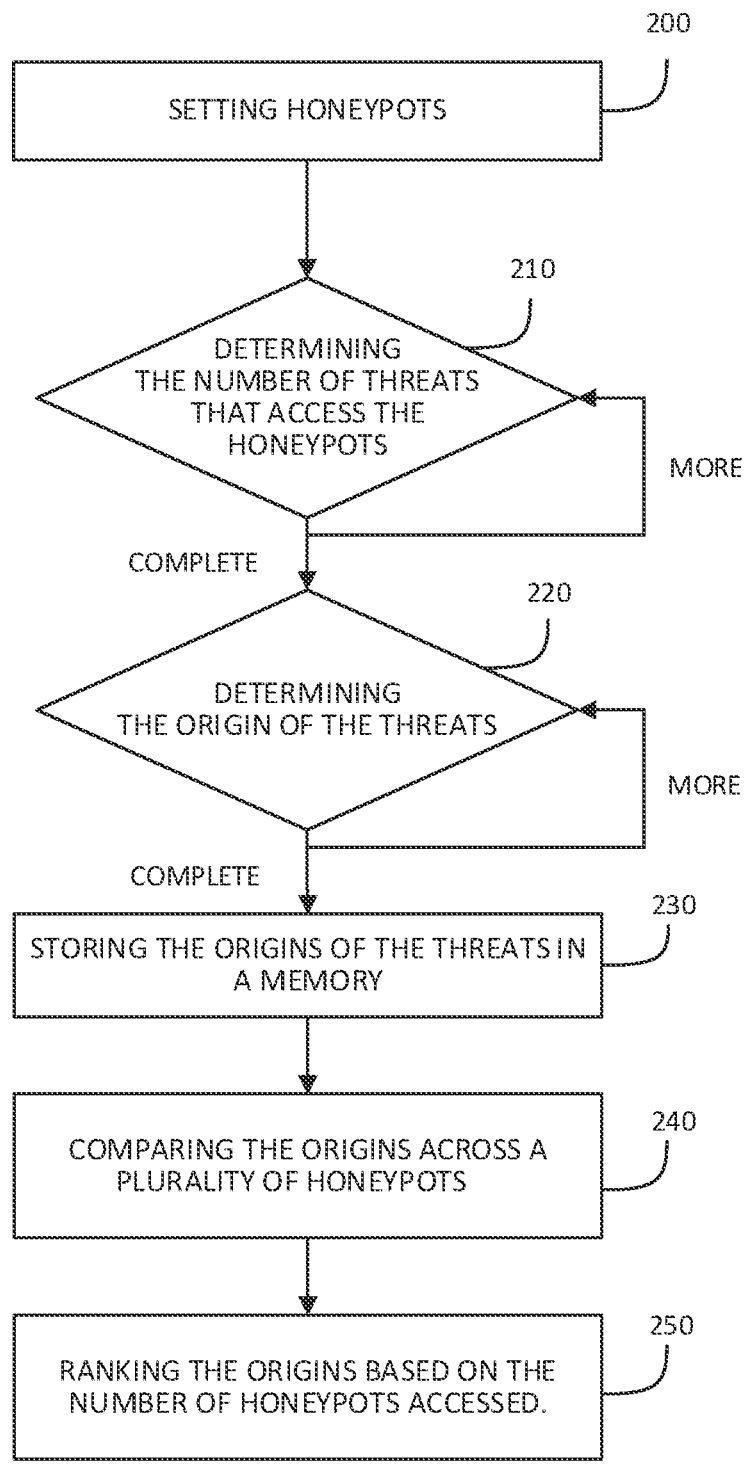
FIG. 2 may illustrate a method of ranking the threats to a network.

FIG. 2 may illustrate one possible method of ranking the threats. At block 200, the honeypots may be set. The honeypots may appear as attractive targets for hackers such as personal information files or files with credit card information. At block 210, the system may determine the number of threats that access the honeypots. The number may a count of the number of access attempts during a period of time. Sometimes, the number may be for the total number of access attempts or may be the number of unique access attempts. The block may continue until the available threats are counted and then control may pass to block 220.

At block 220, the origins of the threats may be determined. In some embodiments, the IP address of the threats may be determined although IP addresses may be of limited value as IP addresses may be hidden behind VPNs. The block may continue until the available threats are evaluated and then control may pass to block 230. At block 230, the IP addresses may be added to a memory or database and even if the real IP addresses are hidden behind a VPN, the extensive use of the same VPN may be noted and stored for future study in the future. For example, the VPN may be contacted for additional information.

At block 240, the IP addresses that have accessed the plurality of honeypots may be analyzed to see if some IP addresses are accessing many honeypots which may indicate an IP address is especially active and dangerous. At block 250, the origin IP addresses may be ranked based on the number of honeypots a single IP addressed has attempted to access. Of course, other methods of ranking and determining the origins are possible and are contemplated.

Referring again to FIG. 1, at block 170, the rankings may be communicated to a user. The user may then decide on the appropriate steps to take base on the rankings. For example, an application which is ranked high may require additional security while an application which is ranker lower may require less attention. In another embodiment, a threshold may be established and any threats over a threshold may be communicated.

In some embodiments, solutions to the threats to a network may be communicated. In some embodiments, only solutions to threats ranked over a network may be communicated. In other embodiments, the system and method may have appropriate permissions to implement the solutions and the solutions may be implemented by the system and method. In other embodiments, permissions may be requested to install the solutions.

Figure 3:
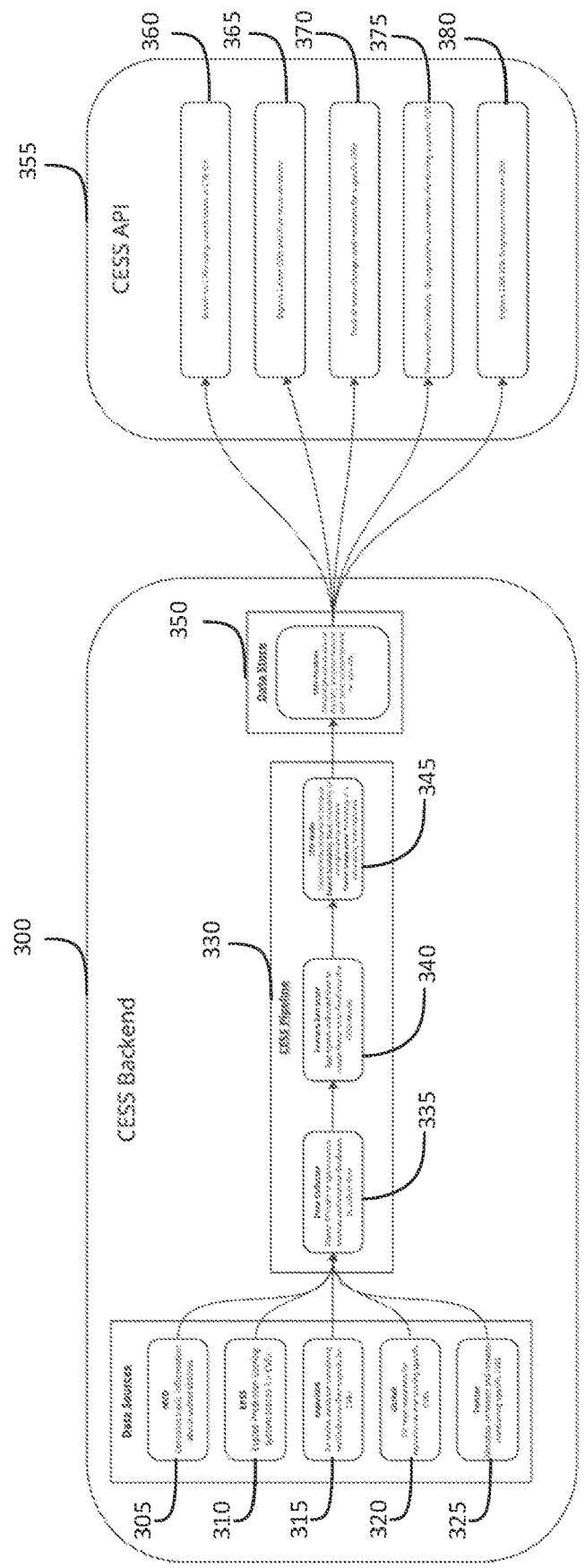
FIG. 3 may illustrate an embodiment of the method.

FIG. 3 may illustrate one embodiment of the system and method. In the backend 300 of the Common Exploit Security System (CESS), data on known threats may be collected. The threats may be collected from one or more of a variety of sources such as NVD 305, the Exploit Prediction Scoring System (EPSS) for common vulnerabilities and exposures (CVE); the Exploit Database 315, GitHub 320 and Twitter, now known as X 325. Of course, other vulnerability databases sources may be used and are contemplated.

At block 330, the collected data may be communicated to a pipeline. At block 335, a data collector may make API calls to open source sources and internal databases to collect data. At block 340, a feature extractor may aggregate the collected data to create features to feed into the model. Features may be normalized indications of vulnerabilities or exploits of vulnerabilities. For example, there may be a list of vulnerabilities and the vulnerabilities may be give a 1 or a 0 to indicate whether the vulnerability is present.

At block 345, the features may be used to create an exploit availability score which may indicate the probability of an exploit being available. The model may also determine an exploit usage score which may indicate the probability of a vulnerability being exploited. In some examples, the exploit scores may be increase manually be the model to further study a specific vulnerability.

At block 350, a data store may contain the data for the CVEs, the extracted features and score variation timeline for each CVE. The data store may be accessible using an API 355. A client may use the API to inquire about a specific CVE 360, to explore latest CVEs and their score variations 365, tracking all score changes and mentions for a specific CVE 370, view identified exploits from online media 375 and exploring other mentions of CESs 380.

In some embodiments, clients may access the system where clients may communicate with the system using protocols to access the APIs and efficiently evaluate risks to the network. In other embodiments the system may be used to manage networks for clients and the protocols and APIs may be used by the network manager to evaluate threats and find solutions.

Figure 4:
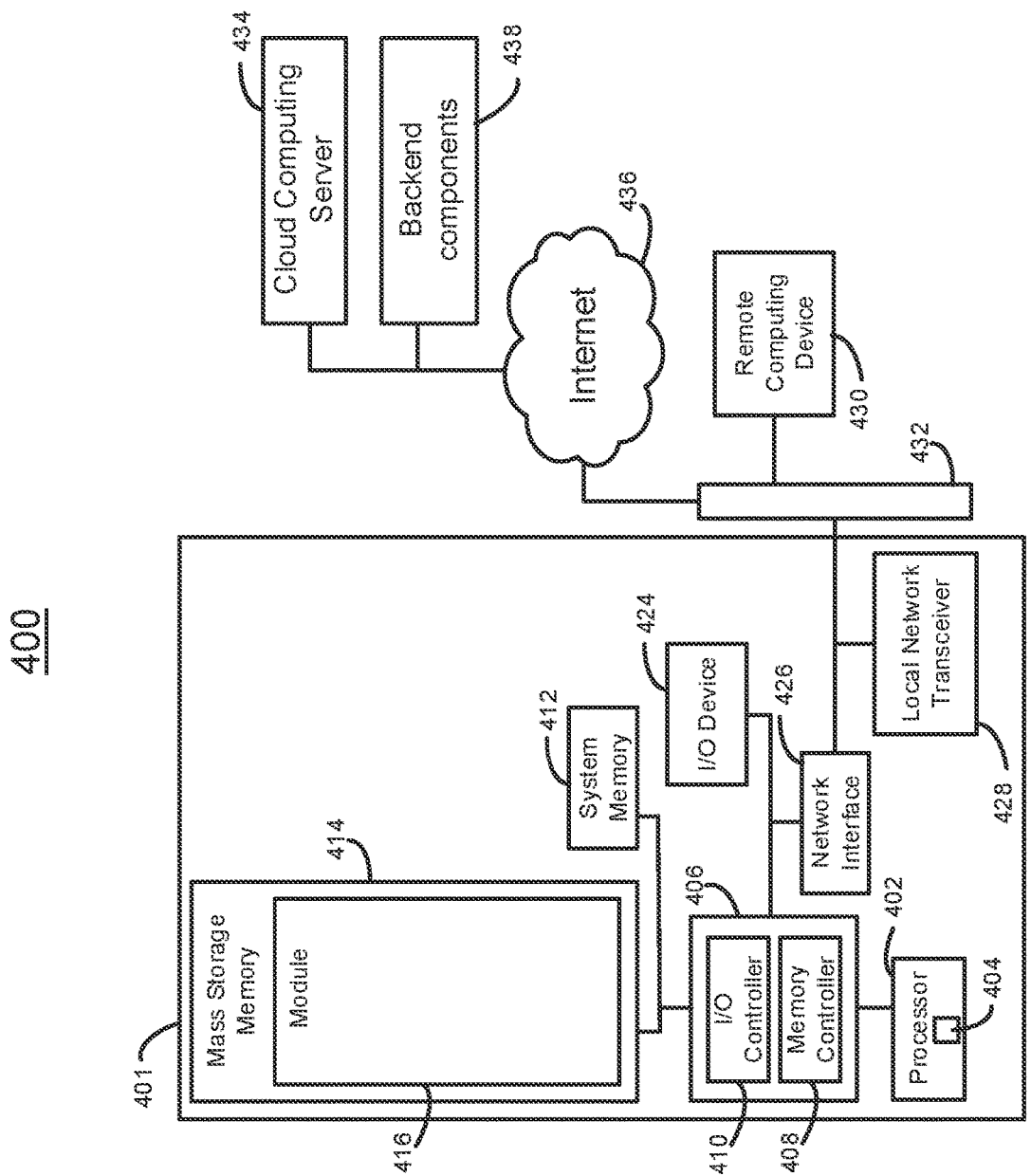
FIG. 4 may illustrate a computer system that may execute the method.

As shown in FIG. 4, the computing device 401 that executes the method may include a processor 402 that is coupled to an interconnection bus. The processor 402 may include a register set or register space 404, which is depicted in FIG. 4 as being entirely on-chip, but which could alternatively be located entirely or partially off-chip and directly coupled to the processor 402 via dedicated electrical connections and/or via the interconnection bus. The processor 402 may be any suitable processor, processing unit or microprocessor. Although not shown in FIG. 4, the computing device 401 may be a multi-processor device and, thus, may include one or more additional processors that are identical or similar to the processor 402 and that are communicatively coupled to the interconnection bus.

The processor 402 of FIG. 4 may be coupled to a chipset 406, which includes a memory controller 408 and a peripheral input/output (I/O) controller 410. As is well known, a chipset may typically provide I/O and memory management functions as well as a plurality of general purpose and/or special purpose registers, timers, etc. that are accessible or used by one or more processors coupled to the chipset 406. The memory controller 408 may perform functions that enable the processor 402 (or processors if there are multiple processors) to access a system memory 412 and a mass storage memory 414, that may include either or both of an in-memory cache (e.g., a cache within the memory 412) or an on-disk cache (e.g., a cache within the mass storage memory 414).

The system memory 412 may include any desired type of volatile and/or non-volatile memory such as, for example, static random access memory (SRAM), dynamic random access memory (DRAM), flash memory, read-only memory (ROM), etc. The mass storage memory 414 may include any desired type of mass storage device. For example, the computing device 401 may be used to implement a module 416 (e.g., the various modules as herein described). The mass storage memory 414 may include a hard disk drive, an optical drive, a tape storage device, a solid-state memory (e.g., a flash memory, a RAM memory, etc.), a magnetic memory (e.g., a hard drive), or any other memory suitable for mass storage. As used herein, the terms module, block, function, operation, procedure, routine, step, and method refer to tangible computer program logic or tangible computer executable instructions that provide the specified functionality to the computing device 401, the systems and methods described herein. Thus, a module, block, function, operation, procedure, routine, step, and method can be implemented in hardware, firmware, and/or software.

In one embodiment, program modules and routines may be stored in mass storage memory 414, loaded into system memory 412, and executed by a processor 402 or may be provided from computer program products that are stored in tangible computer-readable storage mediums (e.g. RAM, hard disk, optical/magnetic media, etc.).

The peripheral I/O controller 410 may perform functions that enable the processor 402 to communicate with a peripheral input/output (I/O) device 424, a network interface 426, a local network transceiver 428, (via the network interface 426) via a peripheral I/O bus. The I/O device 424 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The I/O device 424 may be used with the module 416, etc., to receive data from the transceiver 428, send the data to the components of the system 100, and perform any operations related to the methods as described herein. The local network transceiver 428 may include support for a Wi-Fi network, Bluetooth, Infrared, cellular, or other wireless data transmission protocols. In other embodiments, one element may simultaneously support each of the various wireless protocols employed by the computing device 401. For example, a software-defined radio may be able to support multiple protocols via downloadable instructions. In operation, the computing device 401 may be able to periodically poll for visible wireless network transmitters (both cellular and local network) on a periodic basis. Such polling may be possible even while normal wireless traffic is being supported on the computing device 401. The network interface 426 may be, for example, an Ethernet device, an asynchronous transfer mode (ATM) device, an 802.11 wireless interface device, a DSL modem, a cable modem, a cellular modem, etc., that enables the system 100 to communicate with another computer system having at least the elements described in relation to the system 100.

While the memory controller 408 and the I/O controller 410 are depicted in FIG. 4 as separate functional blocks within the chipset 406, the functions performed by these blocks may be integrated within a single integrated circuit or may be implemented using two or more separate integrated circuits. The computing environment 400 may also implement the module 416 on a remote computing device 430. The remote computing device 430 may communicate with the computing device 401 over an Ethernet link 432. In some embodiments, the module 416 may be retrieved by the computing device 401 from a cloud computing server 434 via the Internet 436. When using the cloud computing server 434, the retrieved module 416 may be programmatically linked with the computing device 401. The module 416 may be a collection of various software playgrounds including artificial intelligence software and document creation software or may also be a Java® applet executing within a Java® Virtual Machine (JVM) environment resident in the computing device 401 or the remote computing device 430. The module 416 may also be a "plug-in" adapted to execute in a web-browser located on the computing devices 401 and 430. In some embodiments, the module 416 may communicate with back end components 438 via the Internet 436.

The system 400 may include but is not limited to any combination of a LAN, a MAN, a WAN, a mobile, a wired or wireless network, a private network, or a virtual private network. Moreover, while only one remote computing device 430 is illustrated in FIG. 6 to simplify and clarify the description, it is understood that any number of client computers may be supported and may be in communication within the system 400.

Additionally, certain embodiments may be described herein as including logic or a number of components, modules, blocks, or mechanisms. Modules and method blocks may constitute either software modules (e.g., code or instructions embodied on a machine-readable medium or in a transmission signal, wherein the code is executed by a processor) or hardware modules. A hardware module may be a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" may be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" may refer to a hardware module. Considering embodiments in which hardware modules are temporarily configured (e.g., programmed), each of the hardware modules need not be configured or instantiated at any one instance in time. For example, where the hardware modules include a processor configured using software, the processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification may be presented in terms of algorithms or symbolic representations of operations on data stored as bits or binary digital signals within a machine memory (e.g., a computer memory). These algorithms or symbolic representations may be examples of techniques used by those of ordinary skill in the data processing arts to convey the substance of their work to others skilled in the art. As used herein, an "algorithm" may be a self-consistent sequence of operations or similar processing leading to a desired result. In this context, algorithms and operations may involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, may be merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "embodiments," "some embodiments" or "an embodiment" or "teaching" may mean that a particular element, feature, structure, or characteristic described in connection with the embodiment is included in at least one embodiment. The appearances of the phrase "in some embodiments" or "teachings" in various places in the specification may not necessarily all be referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments may not be limited in this context.

Further, the figures depict preferred embodiments for purposes of illustration only. One skilled in the art may be readily recognize from the following discussion that alternative embodiments of the structures and methods illustrated herein may be employed without departing from the principles described herein.

Upon reading this disclosure, those of skill in the art may appreciate still additional alternative structural and functional designs for the systems and methods described herein through the disclosed principles herein. Thus, while particular embodiments and applications have been illustrated and described, it is to be understood that the disclosed embodiments may not be limited to the precise construction and components disclosed herein. Various modifications, changes and variations, which may be apparent to those skilled in the art, may be made in the arrangement, operation and details of the systems and methods disclosed herein without departing from the spirit and scope defined in any appended claims.

The invention claimed is:

1. A computer-implemented method of evaluating threats to a computer based network comprising:
    gathering existing threats from a plurality of online sources;
    collecting the existing threats in a database;
    formatting data representing the existing threats in the database for review;
    determining a rating for each of the existing threats;
    evaluating attractiveness of honeypots to threats;
    adjusting the rating for each of the existing threats based on the attractiveness of the honeypots;
    determining an ability of the threats to access the honeypots;
    evaluating applications on a network;
    ranking the existing threats based on the applications on the network using the adjusted rating for each of the existing threats and the ability to access the honeypots; and
    communicating the rankings to a user.

2. The method of claim 1, further comprising communicating solutions to the highest ranked existing threats to a network.

3. The method of claim 1, wherein online sources comprise at least two of:
    National vulnerability database;
    Exploit prediction scoring system;
    exploitDB;
    GitHub; and
    social media accounts.

4. The method of claim 1, wherein formatting data representing existing threats in the database for review comprises representing the existing threats in a numerical form.

5. The method of claim 1, wherein adjusting the rating for each of the existing threats based on the attractiveness of the honeypots comprises:
    setting honeypots and
    determining the number of threats that access the honeypots during a period of time.

6. The method of claim 5, wherein the method further comprises:
- determining an origin of the threats;
- storing the origins;
- comparing the origins across a plurality of honeypots; and
- ranking the origins based on the number of honeypots accessed.

7. A tangible, non-transitory computer readable medium comprising computer executable instruction for evaluating threats to a network, the computer executable instructions comprising instructions for configuring at least one hardware processor for:
- gathering existing threats from a plurality of online sources;
- collecting the existing threats in a database;
- formatting data representing the existing threats in the database for review;
- determining a rating for each of the existing threats;
- evaluating attractiveness of honeypots to threats;
- adjusting the ratings for each of the existing threats based on the attractiveness of the honeypots;
- determining an ability of the threats to access the honeypots;
- evaluate applications on a network;
- ranking the existing threats based on the applications on the network using the adjusted rating for each of the existing threats and the ability to access the honeypots; and
- communicating the rankings to a user.

8. The computer readable medium of claim 7, further comprising computer executable instructions for communicating solutions to the highest ranked existing threats to a network.

9. The computer readable medium of claim 7, wherein online sources comprise at least two of:
- National vulnerability database;
- Exploit prediction scoring system;
- exploitDB;
- GitHub; and
- social media accounts.

10. The computer readable medium of claim 7, wherein formatting data representing existing threats in the database for review comprises representing the existing threats in a numerical form.

11. The computer readable medium of claim 7, wherein adjusting the ratings for the threats based on the attractiveness of the honeypots comprises:
- setting honeypots; and
- determining the number of threats that access the honeypots during a period of time.

12. The computer readable medium of claim 7, further comprising computer executable instructions for:
- determining an origin of the threats;
- storing the origins;
- comparing the origins across a plurality of honeypots; and
- ranking the origins based on the number of honeypots accessed.

13. A computer system comprising a hardware processor, a memory and an input-output circuit, the hardware processor being physically configured according to computer executable instructions for evaluating threats to a network, the computer executable instructions comprising instructions for:
- gathering existing threats from a plurality of online sources;
- collecting the existing threats in a database;
- formatting data representing the existing threats in the database for review;
- determining a rating for each of the existing threats;
- evaluating attractiveness of honeypots to threats;
- adjusting the rating for each of the existing threats based on the attractiveness of the honeypots;
- determining an ability of the threats to access the honeypots;
- evaluate applications on a network;
- ranking the existing threats based on the applications on the network using the adjusted rating for each of the existing threats and the ability to access the honeypots; and
- communicating the rankings to a user.

14. The computer system of claim 13, the computer executable instructions further comprising instructions for communicating solutions to the highest ranked existing threats to a network.

15. The computer system of claim 13, wherein online sources comprise at least two of:
- National vulnerability database;
- Exploit prediction scoring system;
- exploitDB;
- GitHub; and
- social media accounts.

16. The computer system of claim 13, wherein formatting data representing existing threats in the database for review comprises representing the existing threats in a numerical form.

17. The computer system of claim 13, wherein adjusting the ratings for the threats based on the attractiveness of the honeypots comprises:
- setting honeypots;
- determining the number of threats that access the honeypots during a period of time;
- determining the origin of the threats;
- storing the origins;
- comparing the origins across a plurality of honeypots; and
- ranking the origins based on the number of honeypots accessed.

* * * * *